US009521540B2

(12) United States Patent
Liao

(10) Patent No.: US 9,521,540 B2
(45) Date of Patent: Dec. 13, 2016

(54) METHOD OF IDENTIFYING VISITED PUBLIC LAND MOBILE NETWORK AND RELATED COMMUNICATION DEVICE

(71) Applicant: HTC Corporation, Taoyuan (TW)

(72) Inventor: Ching-Yu Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/754,657

(22) Filed: Jun. 29, 2015

(65) Prior Publication Data
US 2016/0007187 A1 Jan. 7, 2016

Related U.S. Application Data

(60) Provisional application No. 62/019,444, filed on Jul. 1, 2014.

(51) Int. Cl.
| | |
|---|---|
| H04W 8/14 | (2009.01) |
| H04L 29/08 | (2006.01) |
| H04M 15/00 | (2006.01) |
| H04W 4/24 | (2009.01) |
| H04W 84/04 | (2009.01) |

(52) U.S. Cl.
CPC .............. *H04W 8/14* (2013.01); *H04L 67/16* (2013.01); *H04M 15/50* (2013.01); *H04W 4/24* (2013.01); *H04W 84/042* (2013.01)

(58) Field of Classification Search
CPC .............................. H04W 8/14; H04W 84/042
USPC ............ 455/435.1, 432.3, 433, 435.2, 404.2, 455/456.1, 432.1
See application file for complete search history.

(56) References Cited

U.S. PATENT DOCUMENTS

| | | | | |
|---|---|---|---|---|
| 8,346,240 | B2 * | 1/2013 | Morales Barbosa | ...................... H04M 3/42357 455/405 |
| 8,744,436 | B2 * | 6/2014 | Antrim | ................. H04W 60/00 455/432.1 |
| 2008/0274736 | A1 * | 11/2008 | Hu | .......................... H04W 8/12 455/433 |
| 2014/0301270 | A1 * | 10/2014 | Johnsson | ............ H04W 76/021 370/328 |
| 2014/0335791 | A1 * | 11/2014 | Kim | ...................... H04W 4/008 455/41.2 |
| 2015/0079899 | A1 * | 3/2015 | Hakola | ................. H04W 8/005 455/39 |
| 2015/0326738 | A1 * | 11/2015 | Li | ....................... H04L 12/1403 455/406 |

(Continued)

OTHER PUBLICATIONS

European Search report issued on Oct. 26, 2015 for EP application No. 15174757.3.

(Continued)

*Primary Examiner* — Cong Tran
(74) *Attorney, Agent, or Firm* — Winston Hsu; Scott Margo

(57) ABSTRACT

A method of identifying a visited public land mobile network (VPLMN) comprises a proximity service (ProSe) function in a home PLMN (HPLMN) of an announcing user equipment (UE) receiving a match report message comprising a ProSe Application Code from a ProSe function in a HPLMN of a monitoring UE; and the ProSe function in the HPLMN of the announcing UE transmitting a match response message comprising a ProSe Application ID Name of the ProSe Application Code and a PLMN ID of a VPLMN registered by the announcing UE to the ProSe function in the HPLMN of the monitoring UE to respond to the match report message.

8 Claims, 5 Drawing Sheets

(56) References Cited

U.S. PATENT DOCUMENTS

2016/0057793 A1* 2/2016 Wang .................... H04W 8/26
370/329

OTHER PUBLICATIONS

Huawei, Hisilicon, "Update on ProSe Direct Discovery via the Serving PLMN", SA WG2 Meeting #101bis, S2-140624, Feb. 17-21, 2014, San Jose Del Cabo, Mexico, XP050770182, pp. 1-14.
3GPP TS 23.303 V12.1.0 (Jun. 2014), "3rd Generation Partnership Project; Technical Specification Group Services and System Aspects; Proximity-based services (ProSe); Stage 2 (Release 12)", XP050774112, pp. 1-60.
HTC, "Clarification of the Monitor Request and Match Report Procedures", SA WG2 Meeting #104, S2-142381, Jul. 7-11, 2014, Dublin, Ireland, XP050836820, pp. 1-6.
Huawei, Hisillicon, "Adding Interaction of Service Platform and ProSe Function", SA WG2 Meeting #101 bis, S2-140625, Feb. 17-21, 2014, San Jose Del Cabo, Mexico, XP050770183, pp. 1-10.
3GPP TR 23.703 V12.0.0 (Feb. 2014), "3rd Generation Partnership Project; Technical Specification Group Services and System Aspects; Study on architecture enhancements to support Proximity-based Services (ProSe) (Release 12)", XP050906656, pp. 1-324.
3GPP TS 23.303 V12.1.0 (Jun. 2014) Technical Specification 3rd Generation Partnership Project; Technical Specification Group Services and System Aspects; Proximity-based services (ProSe); Stage 2 (Release 12).

* cited by examiner

METHOD OF IDENTIFYING VISITED PUBLIC LAND MOBILE NETWORK AND RELATED COMMUNICATION DEVICE

CROSS REFERENCE TO RELATED APPLICATIONS

This application claims the benefit of U.S. Provisional Application No. 62/019,444, filed on Jul. 1, 2014 and incorporated herein by reference.

BACKGROUND OF THE INVENTION

1. Field of the Invention

The present invention relates to a method used in a wireless communication system and related communication device, and more particularly, to a method of identifying a visited public land mobile network and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

An announcing UE can announce information which can be used by UEs in proximity if the UEs have permission for proximity discovery. A monitoring UE can monitor information of interest in proximity transmitted by announcing UEs. For the announcing UE, a ProSe Application Code can be received from a HPLMN ProSe function by performing an announce request procedure. The ProSe Application Code is included in a message which can be transmitted over a radio interface by a UE engaged in a ProSe direct discovery procedure to monitoring UEs. For the monitoring UE, Discovery Filter(s) for monitoring the ProSe Application Code(s) over the radio interface can be received from the HPLMN ProSe function when performing a monitor request procedure.

In prior art, when an announcing UE is registered in a visited public land mobile network (VPLMN), a ProSe function in a home PLMN (HPLMN) of a monitoring UE may provide information of a ProSe Application ID in a match report procedure to a ProSe function in the VPLMN of the announcing UE. If the announcing UE is roaming, the ProSe function in the HPLMN of the monitoring UE learns a VPLMN ID of a serving PLMN for the announcing UE in a monitoring request procedure.

However, the announcing UE may change the serving PLMN, before the monitoring UE detects a ProSe Application Code and starts the match report procedure. The VPLMN ID of the announcing UE stored in the ProSe function in the HPLMN of the monitoring UE may be out of date. The ProSe function in the HPLMN of the monitoring UE may send a notification message to a wrong ProSe function in a different VPLMN of the announcing UE.

Thus, how to handle the outdated VPLMN ID is an important problem to be solved.

SUMMARY OF THE INVENTION

The present invention therefore provides a method and related communication device for identifying a visited public land mobile network to solve the abovementioned problem.

A method of identifying a visited public land mobile network (VPLMN) comprises a proximity service (ProSe) function in a home PLMN (HPLMN) of an announcing user equipment (UE) receiving a match report message comprising a ProSe Application Code from a ProSe function in a HPLMN of a monitoring UE; and the ProSe function in the HPLMN of the announcing UE transmitting a match response message comprising a ProSe Application ID Name of the ProSe Application Code and a PLMN ID of a VPLMN registered by the announcing UE to the ProSe function in the HPLMN of the monitoring UE to respond to the match report message.

A method of identifying a visited public land mobile network (VPLMN) comprises a proximity service (ProSe) function in a home PLMN (HPLMN) of an announcing user equipment (UE) receiving a match report message comprising a ProSe Application Code from a ProSe function in a HPLMN of a monitoring UE; and the ProSe function in the HPLMN of the announcing UE transmitting a match response message not comprising a PLMN ID of a VPLMN registered by the announcing UE to the ProSe function in the HPLMN of the monitoring UE to respond to the match report message.

A communication device for handling a proximity service (ProSe) function in a home public land mobile network (HPLMN) of an announcing user equipment (UE) comprises a storage unit for storing instructions and a processing means, coupled to the storage unit. The processing means is configured to execute the instructions stored in the storage unit. The instructions comprise receiving a match report message comprising a ProSe Application Code from a ProSe function in a HPLMN of a monitoring UE; and transmitting a match response message comprising a ProSe Application ID Name of the ProSe Application Code and a PLMN ID of a visited PLMN (VPLMN) registered by the announcing UE to the ProSe function in the HPLMN of the monitoring UE to respond to the match report message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
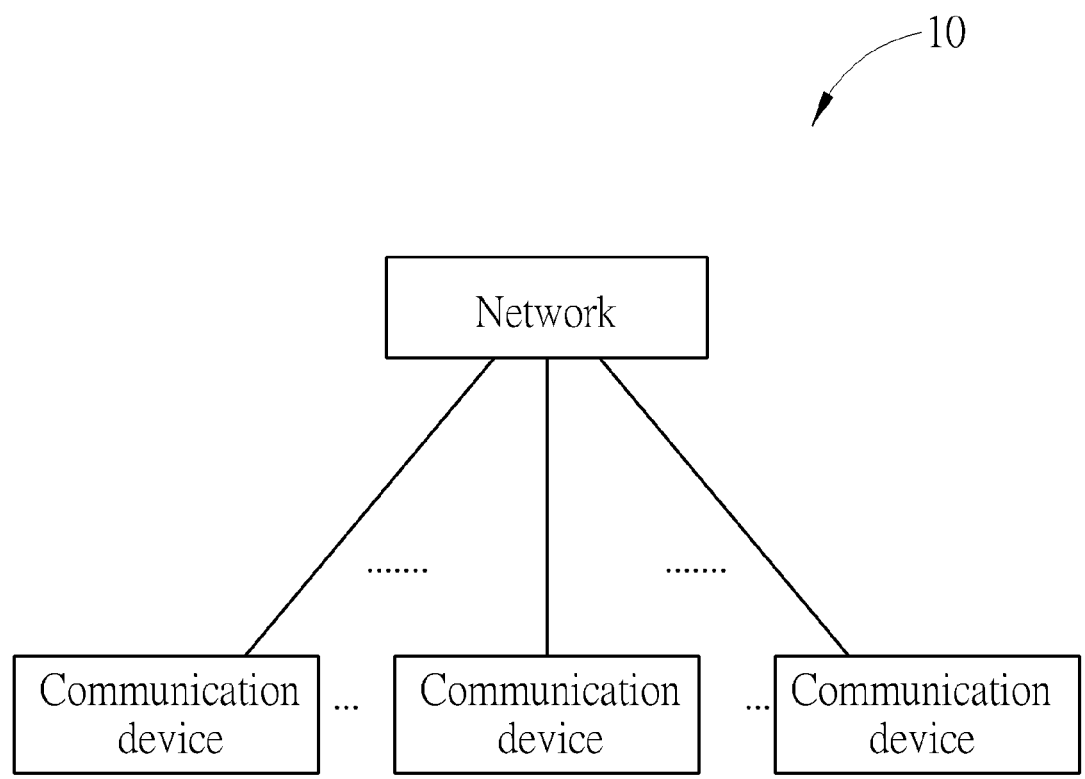
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. A communication device may communicate with the network according to a device-to-cellular (D2C) communication defined in a communication standard, e.g., the 3rd Generation Partnership Project (3GPP) standard. Practically, the network can be a universal terrestrial radio access network (UTRAN) comprising at least one Node-B (NB) in a universal mobile telecommunications system (UMTS). In another example, the network can be an evolved UTRAN (E-UTRAN) comprising at least one evolved NB (eNB) and/or at least one relay in a long term evolution (LTE) system, a LTE-Advanced (LTE-A) system or an evolution of the LTE-A system.

Furthermore, the network can also include both the UTRAN/E-UTRAN and a core network (e.g., evolved packet core (EPC) network), wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, for the D2C communication, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In addition, two communication devices may communicate with each other directly, after an initialization (e.g., connection establishment and/or peer discovery) is performed. For example, the initialization may be assisted by the network. That is, the communication devices may communicate (e.g., transmit and/or receive packets) with each other according to a D2D communication defined in a communication standard, e.g., the 3GPP standard. The communication devices may communicate with each other via UL subframes determined according to frequency-division duplexing (FDD) configuration and/or time-division duplexing (TDD) configurations. The communication device may communicate with another communication device and the network simultaneously, i.e., both the D2D communication and the D2C communication are realized at the same time.

Figure 2:
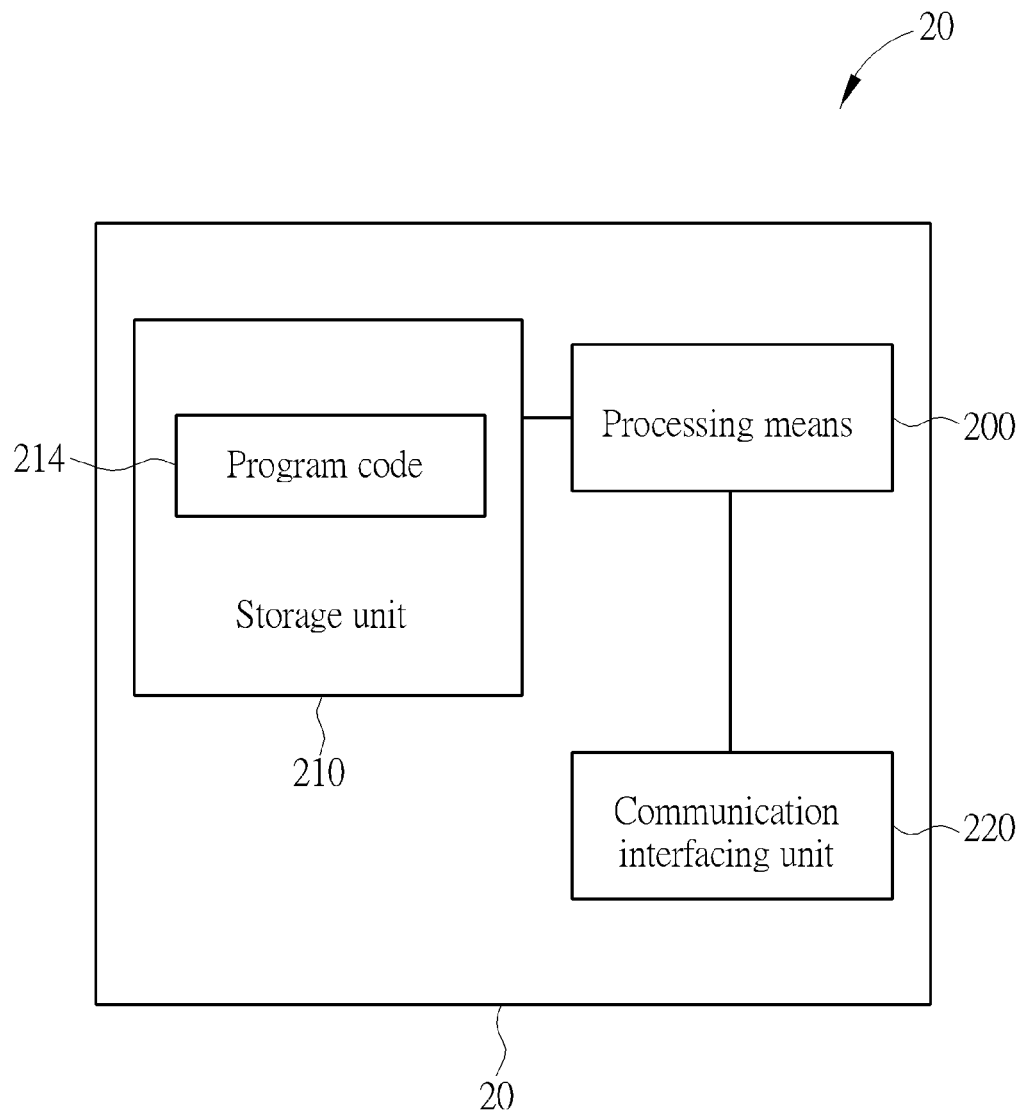
FIG. 2 is a schematic diagram of a communication device according to an example of the present invention.

FIG. 2 is a schematic diagram of a wireless terminal 20 according to an example of the present invention. The wireless terminal 20 may be a communication device or the network shown in FIG. 1, but is not limited herein. The wireless terminal 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
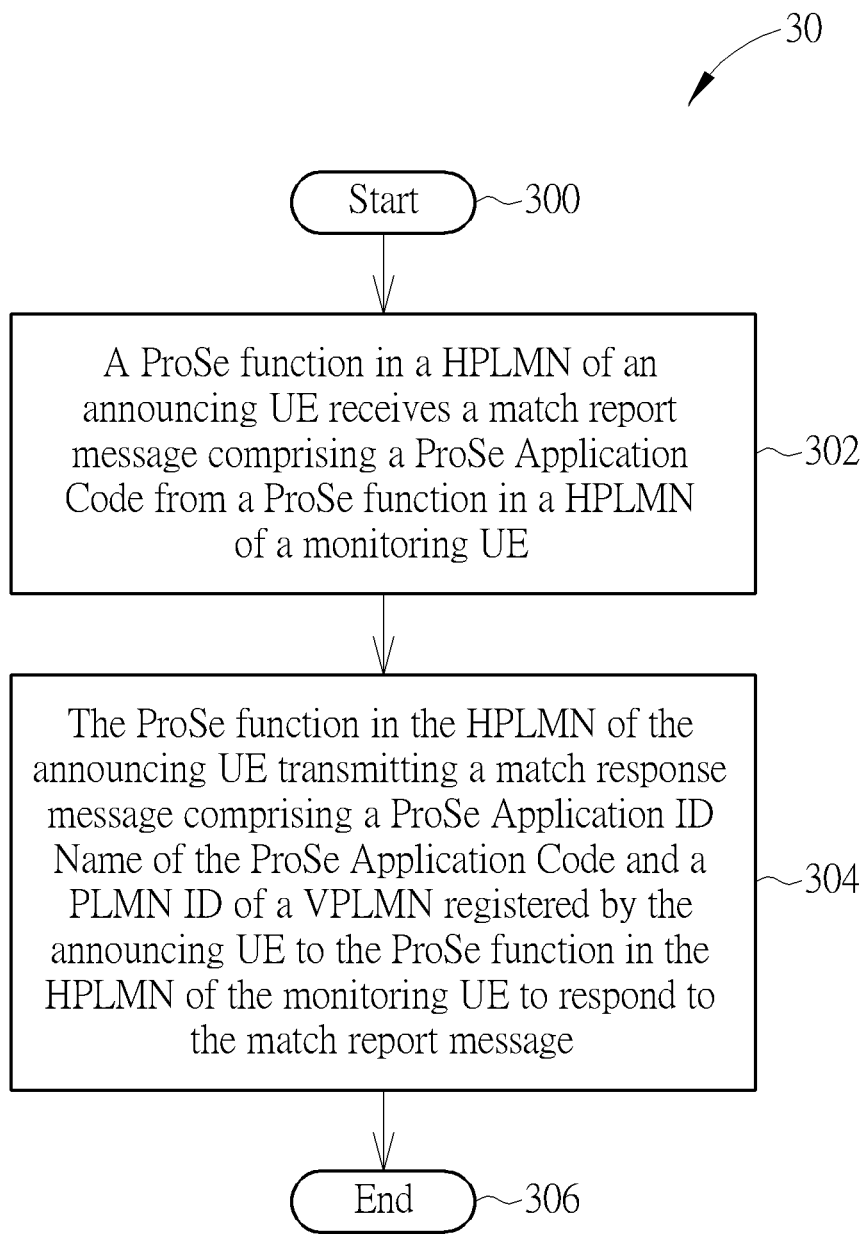
FIG. 3 is a flowchart of a process according to an example of the present invention.

FIG. 3 is a flowchart of a process 30 according to an example of the present invention. The process 30 may be utilized in the wireless communication system 10 for identifying a visited public land mobile network (VPLMN). The process 30 may be compiled into the program code 214 and includes the following steps:

Step 300: Start.

Step 302: A proximity service (ProSe) function in a home PLMN (HPLMN) of an announcing UE receives a match report message comprising a ProSe Application Code from a ProSe function in a HPLMN of a monitoring UE.

Step 304: The ProSe function in the HPLMN of the announcing UE transmitting a match response message comprising a ProSe Application ID Name of the ProSe Application Code and a PLMN ID of a VPLMN registered by the announcing UE to the ProSe function in the HPLMN of the monitoring UE to respond to the match report message.

Step 306: End.

According to the process 30, a ProSe function in a HPLMN of an announcing UE receives a match report message comprising a ProSe Application Code from a ProSe function in a HPLMN of a monitoring UE. Then, the ProSe function in the HPLMN of the announcing UE transmits a match response message comprising a ProSe Application ID Name of the ProSe Application Code and a PLMN ID of a VPLMN (i.e., serving PLMN) registered by the announcing UE to the ProSe function in the HPLMN of the monitoring UE to respond to the match report message. That is, the PLMN ID of the VPLMN currently registered by the announcing UE is provided to the ProSe function in the HPLMN of the monitoring UE, when transmitting the match response message rather than when transmitting a monitor response. In one example, a ProSe Application ID of the ProSe Application Code may be PLMN specific. In one example, the match report message may be transmitted for resolving the ProSe Application Code to a ProSe Application ID Name and a ProSe Application ID. Thus, the problem that the VPLMN may be out of date when the announcing UE is roaming or changing to different PLMN from the previous registered VPLMN due to mobility is solved.

Realization of the present invention is not limited to the above description.

In one example, the ProSe function in the HPLMN of the monitoring UE may transmit a match report info message to a ProSe function in the VPLMN of the announcing UE according to a charging policy, after receiving the PLMN ID of the VPLMN of the announcing UE, wherein the match report info message may include at least one ProSe application ID and UE identity of the monitoring UE. Further, the match report info message may be transmitted for generating a charging record of the ProSe which is performed between the announcing UE and the monitoring UE.

In one example, the PLMN ID of the VPLMN of the announcing UE may be stored in a UE context of the ProSe function in the HPLMN of the announcing UE. The ProSe function in the HPLMN of the announcing UE may transmit a request message for a discovery authorization to a home subscriber server (HSS). Then, the ProSe function in the HPLMN of the announcing UE may receive the PLMN ID of the VPLMN of the announcing UE in a message for responding to the request message from the HSS, wherein the message may also include at least one authorized PLMN IDs that is for updating the latest information stored at the HSS. The ProSe function in the HPLMN of the announcing UE may transmit the request message to the HSS, after receiving an announce request message from the announcing UE for obtaining authorization of an announcement in a direct discovery procedure.

Figure 4:
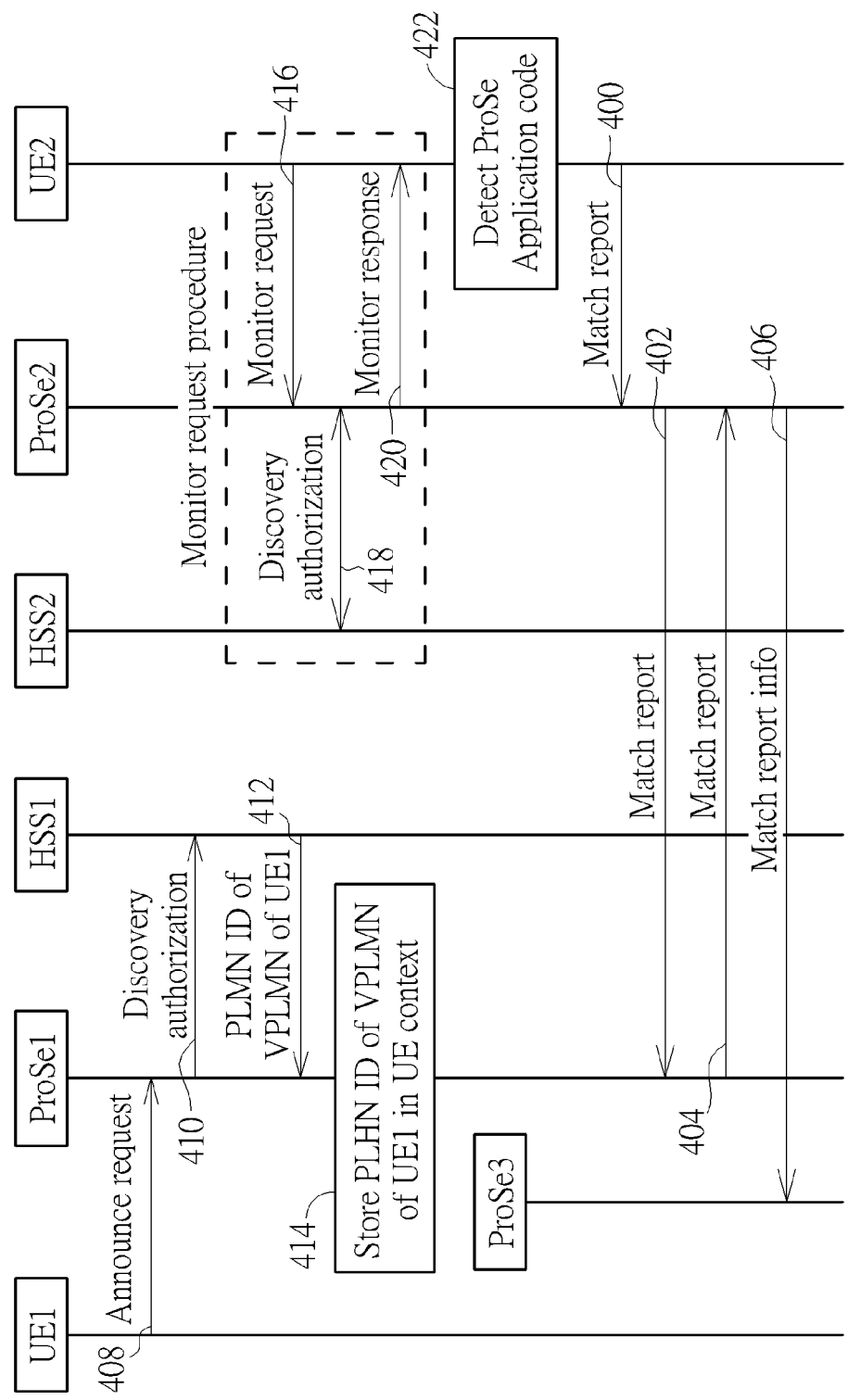
FIG. 4 is a flowchart of a process according to an example of the present invention.

FIG. 4 is a flowchart of a process 40 according to an example of the present invention, where UEs UE1-UE2, ProSe functions ProSe1-ProSe3, and a HSSs HSS1-HSS2 are shown. In the present example, the UE UE1 may be an announcing UE, and the UE UE2 may be a monitoring UE. The ProSe function ProSe1 may be a ProSe function of a HPLMN of the UE UE1, the ProSe function ProSe2 may be a ProSe function of a HPLMN of the UE UE2, and the ProSe function ProSe3 may be a ProSe function of a VPLMN of the UE UE1. That is, the UE UE1 may roam from the HPLMN to the VPLMN which is currently registered by the UE UE1 or the UE UE1 may roam from a VPLMN to a different VPLMN which is currently registered by the UE UE1, before the UE UE2 starts a match report procedure. According to the present invention, the UE UE2 may transmit a match report message to the ProSe function ProSe2 (step 400), wherein the match report message may include a ProSe Application Code and may further include other control information.

The ProSe function ProSe2 may forward the match report message to the ProSe function ProSe1 (step 402), wherein the match report message may include the ProSe Application Code and may further include other control information. Then, the ProSe function ProSe1 may transmit a match response message to the ProSe function ProSe2 to respond to the match report message (step 404). The match response message may include a ProSe Application ID Name of the ProSe Application Code and a PLMN ID of the VPLMN of the UE UE1, and may further include other control information. After receiving the PLMN ID of the VPLMN of the UE UE1, the ProSe function ProSe2 may transmit a match report info message to the ProSe function ProSe3 in the VPLMN of the UE UE1 currently registered according to a charging policy (step 406). The match report info message may include at least one ProSe application ID and UE identity of the UE UE2, and may further include other control information. Thus, the ProSe function ProSe3 may generate a charging record for the ProSe according to the match report info message.

It should be noted that the UE UE2 may transmit the match report message according to various conditions and/or in various situations. An example is illustrated as follows. The UE UE1 may transmit an announce request message to the ProSe function ProSe1 to initiate a proximity discovery (step 408). Accordingly, the ProSe function ProSe1 may transmit a discovery authorization message to the HSS HSS1 for authorization of the proximity discovery (step 410). The ProSe function ProSe1 may receive a message for responding the discovery authorization message from the HSS HSS1 (step 412), wherein the message may include a PLMN ID of the VPLMN of the UE UE1. For example, if the PLMN ID of the registered PLMN of the UE UE1 is not the PLMN ID of the HPLMN of the UE UE1, the registered PLMN is a VPLMN and the HSS HSS1 includes the PLMN ID of the VPLMN of the UE UE1. The ProSe function ProSe1 may store the PLMN ID of the VPLMN in UE context of the UE UE1, after receiving the PLMN ID of the VPLMN (step 414).

On the other hand, the UE UE2 may initiate a monitor request procedure for the proximity discovery. The monitor request procedure may include a transmission of a monitor request message from the UE UE2 to the ProSe function ProSe2 (step 416) in the HPLMN of the UE UE2, a transmission of a discovery authorization message from the ProSe function ProSe2 to the HSS HSS2 (step 418), and a monitor response message for responding to the monitor request message from the HSS HSS2 to the UE UE2 (step 420). Then, the UE UE2 may start to detect one or more ProSe Application Codes (step 422), after performing the monitor request procedure. The UE UE2 may transmit a ProSe Application Code in a match report message to the ProSe function ProSe2 in the HPLMN of the UE UE2 to resolve the ProSe Application Code (step 400), after the ProSe Application Code is detected. The following operations can be referred to the previous description, and are not narrated herein.

Figure 5:
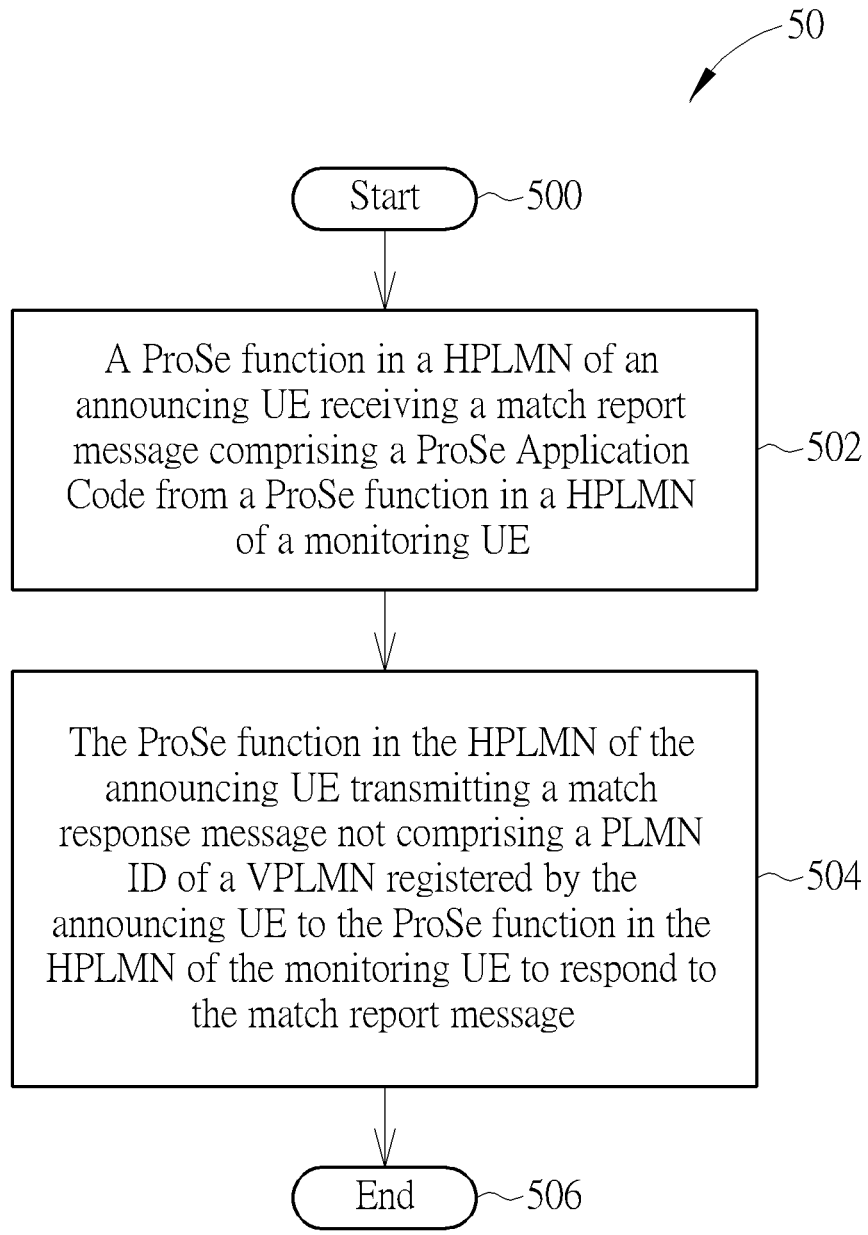
FIG. 5 is a flowchart of a process according to an example of the present invention.

FIG. 5 is a flowchart of a process 50 according to an example of the present invention. The process 50 may be utilized in the wireless communication system 10 for identifying a VPLMN. The process 50 may be compiled into the program code 214 and includes the following steps:

Step 500: Start.

Step 502: A ProSe function in a HPLMN of an announcing UE receiving a match report message comprising a ProSe Application Code from a ProSe function in a HPLMN of a monitoring UE.

Step 504: The ProSe function in the HPLMN of the announcing UE transmitting a match response message not comprising a PLMN ID of a VPLMN registered by the announcing UE to the ProSe function in the HPLMN of the monitoring UE to respond to the match report message.

Step 506: End.

According to the process 50, a ProSe function in a HPLMN of an announcing UE receiving a match report message comprising a ProSe Application Code from a ProSe function in a HPLMN of a monitoring UE. Then, the ProSe function in the HPLMN of the announcing UE transmitting a match response message not comprising a PLMN ID of a VPLMN registered by the announcing UE to the ProSe function in the HPLMN of the monitoring UE to respond to the match report message. In one example, the match response message may include a ProSe Application ID Name of the ProSe Application Code. In one example, a ProSe Application ID of the ProSe Application Code may not be PLMN specific. In one example, the match report message may be transmitted for resolving the ProSe Application Code to a ProSe Application ID Name and a ProSe Application ID. Accordingly, the ProSe function in the HPLMN of the announcing UE may use the ProSe Application ID and UE identity for generating a charging record of the ProSe which is performed between the announcing UE and the monitoring UE. That is, the PLMN ID of the VPLMN currently registered by the announcing UE may not be transmitted in the match response message, e.g., when the ProSe Application ID of the ProSe Application Code is not PLMN specific.

When the ProSe Application Code is resolved to Wild carded ProSe Application ID(s), e.g., country-wide or global-wide, the ProSe function of the HPLMN of the announcing UE may use information of the resolved ProSe Application ID and UE identity for generating the charging record.

A ProSe Application Code mentioned above may include the following parameters: a temporary identity corresponding to a ProSe Application ID Name, and a PLMN ID of the ProSe function that is assigned with the ProSe Application Code. Given a data structure associated with a Public ProSe Application ID, each ProSe Application ID may be associated with a different temporary identity that contains as many identifiers as there are levels in the corresponding ProSe Application ID Name. A monitoring UE may realize a partial matching by using a ProSe Application Mask or a Discovery Filter, and effective and flexible filtering of the received temporary identity can be achieved.

A ProSe function (i.e., ProSe function entity) mentioned in the above examples may be realized in a server, a NB, an eNB, a relay, or the network in FIG. 1 and is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related communication device for identifying a VPLMN of an announcing UE. The problem that the VPLMN may be out of date when the announcing UE is roaming is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identifying a visited public land mobile network (VPLMN), the method comprising:
   a proximity service (ProSe) function in a home PLMN (HPLMN) of an announcing user equipment (UE) receiving a match report message comprising a ProSe Application Code from a ProSe function in a HPLMN of a monitoring UE;
   the ProSe function in the HPLMN of the announcing UE determining whether a ProSe Application ID of the ProSe Application Code is PLMN specific and whether the announcing UE is roaming; and
   the ProSe function in the HPLMN of the announcing UE transmitting a match response message comprising a ProSe Application ID Name of the ProSe Application Code and a PLMN ID of a VPLMN registered by the announcing UE to the ProSe function in the HPLMN of the monitoring UE to respond to the match report message, if the ProSe Application ID of the ProSe Application Code is PLMN specific and the announcing UE is roaming.

2. The method of claim 1, further comprising:
   the ProSe function in the HPLMN of the monitoring UE transmitting a match report info message to a ProSe function in the VPLMN of the announcing UE according to a charging policy, after receiving the PLMN ID of the VPLMN of the announcing UE;
   wherein the match report info message comprises at least one ProSe application ID and UE identity of the monitoring UE.

3. The method of claim 2, wherein the match report info message is transmitted for generating a charging record of the ProSe between the announcing UE and the monitoring UE.

4. The method of claim 1, wherein the PLMN ID of the VPLMN of the announcing UE is stored in a UE context of the ProSe function in the HPLMN of the announcing UE.

5. The method of claim 4, further comprising:
the ProSe function in the HPLMN of the announcing UE transmitting a request message for a discovery authorization to a home subscriber server (HSS); and
the ProSe function in the HPLMN of the announcing UE receiving the PLMN ID of the VPLMN of the announcing UE in a message for responding to the request message from the HSS.

6. The method of claim 5, wherein the ProSe function in the HPLMN of the announcing UE transmits the request message to the HSS, after receiving an announce request message from the announcing UE for obtaining authorization of an announcement in a direct discovery procedure.

7. A method of identifying a visited public land mobile network (VPLMN), the method comprising:
a proximity service (ProSe) function in a home PLMN (HPLMN) of an announcing user equipment (UE) receiving a match report message comprising a ProSe Application Code from a ProSe function in a HPLMN of a monitoring UE;
the ProSe function in the HPLMN of the announcing UE determining whether a ProSe Application ID of the ProSe Application Code is PLMN specific and whether the announcing UE is roaming; and
the ProSe function in the HPLMN of the announcing UE transmitting a match response message comprising a ProSe Application ID Name of the ProSe Application Code but not comprising a PLMN ID of a VPLMN registered by the announcing UE to the ProSe function in the HPLMN of the monitoring UE to respond to the match report message, if the ProSe Application ID of the ProSe Application Code is not PLMN specific and the announcing UE is roaming.

8. The method of claim 7, wherein the ProSe function in the HPLMN of the announcing UE uses the ProSe Application ID and UE identity for generating a charging record of the ProSe between the announcing UE and the monitoring UE.

* * * * *